May 9, 1967

A. M. GILDONE 3,317,966

HOSE CLAMP

Filed Feb. 16, 1966

INVENTOR.
ANTHONY M. GILDONE
BY
Watts & Fisher
ATTORNEYS

United States Patent Office 3,317,966
Patented May 9, 1967

3,317,966
HOSE CLAMP
Anthony M. Gildone, 26580 Oriole Ave.,
Euclid, Ohio 44117
Filed Feb. 16, 1966, Ser. No. 527,977
3 Claims. (Cl. 24—27)

This invention relates to an improved hose clamp of the spring type.

Spring-type hose clamps are formed of a length of spring wire formed in a spiral loop. The ends of the length of wire are bent outwardly from the loop to form extending arms. Portions of the loop immediately adjacent the extending arms are in side-by-side relationship so that the loop is closed and the extending arms are spaced apart from each other. The clamp is expanded against the spring tension of the loop by squeezing the extending arms toward each other. In expanded condition, the loop is adapted to encircle a hose of a somewhat smaller outside diameter than the expanded loop. When the loop is allowed to contract under spring tension it reverts to a diameter that is smaller than the outside diameter of the hose. With the end of the hose telescoped over a tubular hose connection, the spring tension squeezes the hose about the connection, forming a fluid-tight seal and holding the hose in place.

While spring-type hose clamps are essentially simple devices in principle, there are several practical problems involved in their construction and use. To provide a seal that is fluid-tight under even moderate pressures, the hose clamp must closely conform to a somewhat reduced outside diameter of the hose to provide complete circumferential clamping. The clamp must apply a high gripping force to effectively seal the connection. As a result, it is difficult to expand the loop for installation. Normally a special tool is required to engage and squeeze the extending ends together. The clamp is then slid over the end of the hose, the hose placed over the connection and the clamp worked into place and released. This is time consuming and often difficult and frustrating, particularly when a hose is being installed in an awkward location, as it so often is.

The range of hose sizes to which a given clamp can be applied is limited by the need for the clamp to conform to the hose diameter and apply a clamping force uniformly about the circumference. The difficulty in expanding the clamp further limits the variation in hose diameter that can be accommodated by a given diameter clamp, as does the tendency of the relatively stiff spring wire to fatigue if stressed by over expansion of the loop. As a result, a very large assortment of clamp sizes must be provided to accommodate the different diameter hoses that are made. Even a very small variation in the size of the outside diameter of a hose normally requires a different size clamp.

Some of the above-mentioned problems have in part been overcome by the hose clamp disclosed in U.S. Patent No. 2,629,908 issued to Cecil W. Keck and entitled, Hose Clamp. As disclosed therein, a hose clamp loop is held in an expanded condition by opening the loop and aligning the extending arms. A longitudinal groove and rib is used or flat portions are provided on the extending arms to prevent the abutting surfaces from slipping to the side due to the tendency of the loop to return to its spiral configuration.

The present invention is an improvement over the clamp disclosed in the above mentioned patent. The loop of this improved clamp is maintained in expanded condition and the extending arms aligned by an improved construction of the cooperative surfaces formed on the extending arms. These surfaces are designed to maximize both the ease of opening the loop to align the arms and the ease of closing the loop from the expanded position, while yet adequately securing the loop in expanded condition for assembly. The improved construction diminishes the distance the loop must be expanded and therefore reduces the force needed to expand and secure the loop in expanded position. It also follows that the loop is not stressed to as great an extent, reducing the chance of over stressing and weakening the clamp. With the loop held in expanded condition it is a simple matter to slip it over a hose, position the hose, and release the arms to apply clamping pressure.

In addition to the above, a loop is provided that facilitates a greater variation in hose size for a loop of given diameter and quantity of wire, while at the same time providing surfaces on the extending arms that hold the loop expanded. This has been accomplished by using a wire that is equal in weight per unit length to the conventional round wire, but forming it of rectangular cross section. With the presently used circular spring wire, the effective cross section thickness of the wire is equal to the diameter. This in part establishes the stiffness of the clamp. In one embodiment of the present invention, the wire loop is formed of a rectangular cross section in which the radial thickness of the wire does not exceed the width. This provides a substantial decrease in the effective thickness of the wire, as compared with the diameter of a wire of circular cross section made from the same quantity of metal. As a result, the clamp is more flexible and can more easily be expanded, and without risk of over stressing. Thus, a given diameter loop can more readily accommodate a larger variation of hose sizes. This in turn means decreased manufacturing costs and less items for the supplier and user to stock. As the same time, the flat surfaces of the wire along the outwardly extending ends provide sufficient stability to hold the clamp in expanded condition without special interengaging parts or shapes different from the main body of the wire.

A further feature of this invention, which greatly facilitates the installation of hose members to connectors and which assures that a proper hose clamp is supplied and used with the proper size hose, is the preattachement of a hose clamp in expanded condition about the end of a hose. Preferably, a circumferential or partially circumferential groove is provided in the outside surface of the hose at the proper location for the hose clamp. The clamp is secured in place in the groove, as by an adhesive, along a portion of the hose clamp diametrically opposite from the extending arms, which hold the clamp open. With this arrangement, a sub-assembly of a hose and an attached, open hose clamp positioned on the hose can be easily placed over a connection. The hose clamp is then closed by twisting the extending ends to the side of each other and allowing the clamp to close under the spring force of the loop.

These and other features and advantages of this invention will become more apparent as the same become better understood by reference to the following detailed description, when taken in conjunction with the accompanying drawings, in which.

Figure 11:
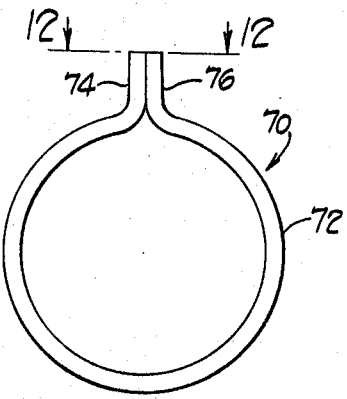
Figure 12:
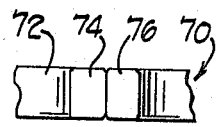

FIGURE 11 is a front elevational view of a third embodiment of a hose clamp constructed in accordance with the present invention in which the wire forming the clamp is rectangular in cross section; and FIGURE 12 is a top plan view of the hose clamp of FIGURE 11, illustrating the manner in which the rectangular cross section of the hose clamp maintains the clamp in expanded condition without specially shaped mating surfaces.

Figure 1:
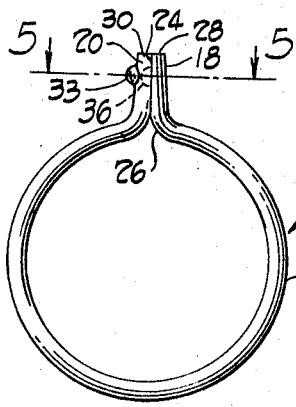
FIGURE 1 is a front elevational view of an embodiment of this invention, showing a hose clamp in expanded condition and illustrating one form of mating surfaces for maintaining the clamp in expanded condition.
Figure 2:
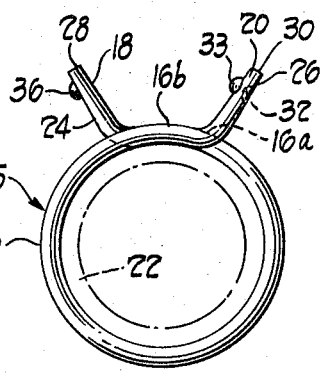
FIGURE 2 is a front elevational view of the hose clamp of FIGURE 1 in closed position in which it tightly encircles a hose to clamp the hose to a connection.
Figure 3:
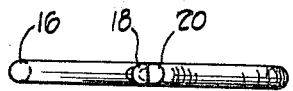
FIGURE 3 is a top plan view of the expanded hose clamp of FIGURE 1.
Figure 4:
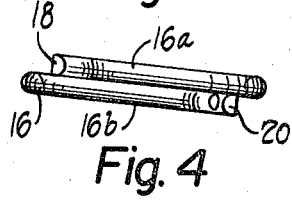
FIGURE 4 is a top plan view of the closed hose clamp of FIGURE 2.

Referring now to the drawings, there is shown in FIGURES 1 to 5 a hose clamp 15 formed of a loop of spring wire 16 circular in cross section and having end portions 18 and 20 extending outwardly from the loop 16, essentially radially. As illustrated in FIGURES 2 and 4, the loop 16 is of a spiral configuration, with portions 16a and 16b adjacent the arms 18 and 20, respectively, in side-by-side relationship. A radiator hose 22 is shown in phantom in FIGURE 2 encircled by the hose clamp 15. The hose clamp 15 of FIGURE 2 is in assembled position, tightly encircling and pressing the hose 22. This compresses the hose about a hose coupling (not shown) that is normally inserted within the end of the hose 22.

The arms 18 and 20 are constructed and arranged to hold the loop 16 in an expanded, assembling position, as best shown in FIGURE 1 of the drawings. In the assembling position, the two arms 18 and 20 are in aligned, abutting relationship. The loop 16 is expanded and no longer in a spiral configuration. In the expanded condition, the loop 16 is larger than the outside diameter of the hose 22.

The specific construction of the arms 18 and 20, and the manner in which they cooperate to maintain the loop 16 in expanded position is best understood from FIGURES 1–3 and 5. With the loop in the assembling position of FIGURES 1, 3 and 5, a surface 24 of arm 18 faces and abuts a surface 26 of arm 20. These surfaces form relatively flat portions along the length of the arms 18 and 20 and are angled with respect to the central axis of the wire so as to taper the arms 18 and 20 from the cross sectional area of the wire adjacent the loop 16 to a smaller cross sectional area at the terminal ends 28 and 30 of the arms. With this shape, the ends of the wire need not be bent as sharply from the loop as otherwise would be required to form arms that would abut along their length.

The surface 26 of arm 20 has a recess 32 (FIGURES 2 and 5) which, in the preferred construction shown, is dome-like in shape, preferably hemispherical. Due to the manner in which the recess 32 is formed, the back of the arm is distorted, as indicated by the protrusion 33. This has no function, and the recess 32 may be formed in other ways which do not cause the metal behind the recess to be displaced in the manner shown.

A protuberance 36 projects from the surface 24 of the arm 18 and is of a size and shape to be received within the recess 32.

As best illustrated in FIGURES 1 and 2, the protuberance 36 and recess 32 are located on their respective surfaces 24 and 26 closer to the terminal ends 28 and 30 of the arms 18 and 20 than to the adjacent portions of loop 16. The significance of this location can be best understood from FIGURE 1 and the following explanation.

The arms 18 and 20 are in abutting position as shown in FIGURE 1. This is the position in which the hose clamp may be most conveniently supplied to the user, because the clamp is in expanded, assembling position and can readily receive the hose 22. The protuberance 36 received within the recess 32 prevents the two arms 18 and 20 from sliding sideways relative to each other under the force of the loop 16, which tends to force the arms in opposite sideways directions due to the inherent spiral form. At the same time, the loop 16 is applying a large compressive force, pressing the two arms 18 and 20 together.

In order to clamp the hose 22 with the hose clamp 15, the arms 18 and 20 must be separated apart a distance equal to the amount the protuberance 36 extends from the surface 24. From FIGURE 1, it can be appreciated that when the loop 16 is expanded from the assembling position in order to remove the protuberance 36 from the recess 32, the arms 18 and 20 separate. This separation occurs essentially as a pivotal movement about an axis passing through the loop 16 at a point diametrically opposite from the arms 18 and 20. While there is, of course, flexure of the loop about substantial portion of its length, the flexure may be considered as occurring at the location stated. As a result, the upper or terminal ends 28 and 30 of the arms 18, 20 move through a larger distance along an essentially arcuate path than does the base of the arms 18, 20 adjacent the loop portion 16. Therefore, by limiting the location of the inter-engaging parts 36, 32 to a position adjacent the outer ends 28, 30 of the arms 18, 20, the loop can be released from its assembling position with the least amount of additional expansion of the loop portion 16 over that shown in FIGURE 2. While the magnitude of the difference in the amount of expansion needed to separate a protuberance adjacent the outer ends of the arms as compared with a protuberance adjacent the inner ends is not great, it is significant. As with any simple spring, the force needed to deform the spring increases in direct relationship with the deformation. Therefore, even a slight reduction in the extent to which the loop must be expanded at the open position of the loop becomes significant in terms of the force needed to open and to release the loop. Moreover, in the assembling position shown in FIGURE 1, the spring is deformed to nearly the maximum permissible amount. Further expansion of the loop from that shown in the assembling position not only requires great force but also might stress the spring beyond the elastic limit and substantially weaken its ability to form a tight seal when in the assembled position shown in FIGURE 1. It is therefore desirable to reduce the magnitude of additional deformation needed to place the spring in expanded condition or release it therefrom, while at the same time providing the largest expanded diameter possible, to easily receive the hose. The present arrangement provides this.

The ease of disengaging the protuberance 36 from the recess 32 is also enhanced in the construction shown, due to the dome-like or hemispherical shape of the protuberance 36. With this shape, a sideways, twisting, force applied to the arms 18 and 20, in opposite directions, causes the surface of the protuberance 36 to cam the arms 18 and 20 apart. As the two arms get farther apart, the slope of the interengaging surfaces of the recess and the protuberance diminishes, providing a higher mechanical advantage as the force exerted by the spring increases due to the additional deformation. Thus, the shape helps offset the additional force, readily facilitating the disengagement upon the application of a proper twisting or sidewise movement of the arms 18 and 20.

A second embodiment of this invention is shown in FIGURES 6 to 9 of the drawings. This construction, while somewhat different from that described above, embodies many of the same advantageous features. A hose clamp 40 having a loop portion 42 and arm portions 44 and 46 is shown in assembled position in FIGURE 7, encircling a hose 48. The hose clamp is shown in expanded, assembling position in FIGURE 6. In all respects, except for the facing surfaces of the arms 44, 46, the clamp of FIGURES 6 to 9 is constructed as the clamp previously described.

The extending arm 44 is formed by bending a portion of the wire forming loop 42 in an outward direction, so that it extends essentially radially of the loop 42. The arm 44 is circular in cross section, as is the loop portion 42.

Figure 8:
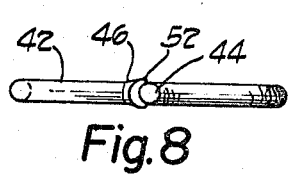
FIGURE 8 is a top plan view of the expanded hose clamp of FIGURE 6, showing the manner in which the extending arms of the hose clamp interlock to maintain the clamp expanded.
Figure 9:
FIGURE 9 is an end view of an extending arm of the hose clamp of FIGURES 6 and 7 taken along the plane indicated by the line 9—9 of FIGURE 7.

The arm 46 has a concave facing surface 50 that is in abutting relationship with the arm 44 when the loop 42 is in expanded position. The thickness of the arm 46 in the plane of the loop 42 decreases in a direction from the adjacent loop portion 42 to the terminal end 52 of the arm 46. The width of arm 46 in a transverse plane to the loop 42 increases in the same direction so that the arm is wider adjacent the end 52 than adjacent the loop portion 42. This is best shown in FIGURE 8.

Preferably the concave surface 50 is curved, and as shown is cylindrical. The surface 50 is angled with respect to the central axis of the wire portion forming the arm 46, as indicated in dotted line in FIGURES 6 and 7. As a result, a tapered groove or recess is provided which has its greatest depth adjacent the end portion 52 and meets the cylindrical surface of the arm 46 prior to the juncture between the arm 46 and the loop portion 42. The depth of the groove at the end 52 is just sufficient to retain the arm 44 when the spring is in expanded condition.

Figure 6:
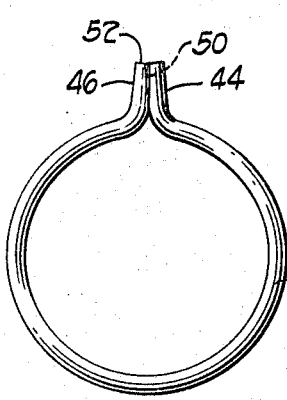
FIGURE 6 is a front elevational view of a second embodiment of a hose clamp constructed in accordance with the present invention, showing the clamp in expanded condition.
Figure 7:
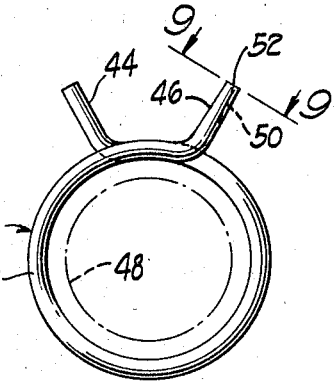
FIGURE 7 is a front elevational view of the hose clamp of FIGURE 6 in closed position.
Figure 5:
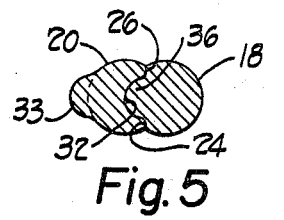
FIGURE 5 is a sectional view of the extending arms of the hose clamp of FIGURE 1, taken along the line 5—5 of FIGURE 1 and showing constructional details of the mating surfaces of the arms.

With this construction, the two arms 44, 46 are inclined slightly toward each other when the clamp is in expanded, assembling position, as shown in FIGURE 6, with the arm 44 received by the surface 50. The arms 44, 46 separate from each other in the same manner as described in connection with the previous embodiment when the loop 42 is further expanded from the assembling position of FIGURE 6 to release the two arms so that the clamp can close to the position shown in FIGURE 7. Thus, the outer ends of the arms 44, 46 move in a longer arc than the inner ends connected with the loop portion 42. This removes the arm 44 from the shallow inner portion of the groove or concave surface 50 and from the deeper outer portion of the groove at the same time, reducing the magnitude of the expansion necessary to engage or disengage the arms as compared with a clamp having a groove of uniform depth along the entire length of the arm 46.

Figure 10:
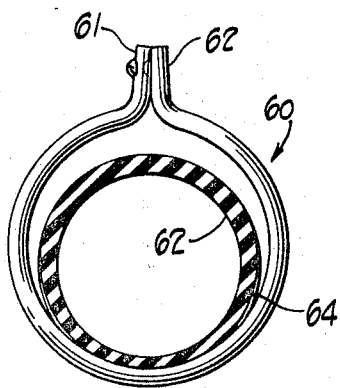
FIGURE 10 is a front elevational view of a hose clamp of the type shown in FIGURES 1 and 2, in expanded condition, connected to a hose shown in transverse cross section, illustrating the manner in which an expanded hose clamp and hose can be supplied as an assembly.

In FIGURE 10 of the drawings, a hose clamp 60 of a type designed to stay in an expanded, assembling position by the abutment of extending arm portions 61, 62 is shown encircling a hose 63. The hose 63 is formed with an external groove 64 extending at least partially around the circumference of the hose 63. In a preferred construction shown, the groove 64 extends about the lower half of the hose. It is deepest at the portion diametrically opposite from the outwardly extending arms 61, 62 of the clamp 60 and diminishing in depth as it extends in opposite directions, ending about midway around the hose. The hose clamp 60 is suitably secured in the groove 64 in a position encircling the hose 62 by an adhesive that bonds the clamp 60 to the hose at the deepest part of the groove. With the clamp 60 in expanded, assembling position and secured to the hose 62, the hose and clamp may be conveniently assembled to a hose connection by merely slipping the hose over the connection and releasing the arms 61, 62. Previously, it was necessary to first expand the hose clamp, slip it over the hose, apply the hose to the hose connection, slide the clamp while expanded along the hose until it is in proper position near the end of hose, encircling both the hose and the hose connection, and release the clamp. The present arrangement not only assures that the hose clamp will be in proper position on the hose, but it also greatly simplifies the attachment procedure and assures that a proper clamp is applied with and used with a proper size hose.

A third embodiment of a hose clamp constructed in accordance with this invention is shown in FIGURES 11 and 12 of the drawings. A hose clamp 70 is shown having a loop portion 72 and two outwardly extending arms 74, 76 at the ends of the loop portion 72. In this embodiment the wire forming the clamp 70 is rectangular in cross section, as illustrated in FIGURE 12. When the clamp is in an expanded condition for assembly, abutting faces 78, 80 of the arms 74, 76 oppose each other and maintaining the loop in expanded position. The combination of the flat surfaces and the high force exerted between the two surfaces by the spring action of the loop 72 provides sufficient friction force between the two arms to maintain them in abutting relationship against the spring tendency of the loop to return to a helical form. If desired, interengaging portions such as a protuberance and recess or a groove as provided in the two previous embodiments may also be used to provide additional assurance that the loop will remain in expanded position, but normally are not necessary.

The rectangular shape, in addition to providing a convenient and inexpensive construction for maintaining the loop in expanded position, also serves a second purpose. The rectangular shape of the wire provides a wire thickness radially of the loop that is no greater and preferably somewhat less than the width of the wire axially of the loop. Thus, for a given amount of material in the wire forming the loop 72, the thickness of the rectangular wire is diminished as compared with the diameter of a round wire. As a result, the wire is more flexible than a wire of comparable material formed in a circular cross section. This increased flexibility permits greater distortion of the loop 72 without causing undue stress and fatigue of the metal. As a result, the loop will readily accommodate varying diameter hoses to a greater extent than a loop of circular cross section of comparable weight and loop diameter. This of course means that few sizes of hose clamps are required, reducing the number of clamps that must be stocked by the user or seller to accommodate the normal variations in hose diameter.

While certain preferred embodiments of the present invention have been described in particularity, it will be readily apparent that many modifications or alterations may be made therein without departing from the spirit and scope of the invention, as set forth in the appended claims.

What is claimed is:

1. A hose clamp comprising a resilient loop portion and two end portions on the loop projecting outwardly therefrom, to present substantially radial arms, said arms being positionable with opposing surfaces in abutting relationship to each other when the loop is resiliently expanded to a large diameter, a recess in one of said opposing surfaces shaped to receive a surface of the other of said arms, and a dome-shaped protuberance extending from the opposing surface of the other said arms, receivable in the said recess, spaced inwardly from the outer end of the arm, and located beyond the mid-point along the arm, in a direction away from the loop portion.

2. The hose clamp of claim 1 wherein each arm is tapered from a larger cross section adjacent the loop portion to a smaller cross section at the outer end and wherein the recess is of essentially the same configuration as the protuberance.

3. The hose clamp of claim 1 including a hose having a portion extending axially within the loop, a groove in the hose extending at least partially circumferentially about the hose and receiving a portion of the loop of the hose clamp diametrically opposite the arms, and means securing the hose clamp in the groove regardless of whether the clamp is open or closed.

References Cited by the Examiner

UNITED STATES PATENTS

| | | | |
|---|---|---|---|
| 2,629,908 | 3/1953 | Keck | 24—20 |
| 2,817,130 | 12/1957 | Roberts et al. | 24—27 |
| 2,874,430 | 2/1959 | Coldren | 24—27 |

JAMES L. JONES, *Primary Examiner.*